United States Patent
Doatmas et al.

(10) Patent No.: US 7,779,348 B2
(45) Date of Patent: Aug. 17, 2010

(54) APPARATUS, SYSTEM, AND METHOD FOR RENDERING MULTIPLE SEGMENT HYPERTEXT SCRIPT

(75) Inventors: Philip Matthew Doatmas, Flagstaff, AZ (US); Brian Sean McCain, Mountain View, CA (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/464,735

(22) Filed: Aug. 15, 2006

(65) Prior Publication Data

US 2008/0046813 A1    Feb. 21, 2008

(51) Int. Cl.
*G06F 17/28* (2006.01)
(52) U.S. Cl. ...................................... 715/234
(58) Field of Classification Search .................. 715/234
See application file for complete search history.

(56) References Cited

U.S. PATENT DOCUMENTS

| 6,476,833 B1 * | 11/2002 | Moshfeghi | 715/854 |
| 6,721,722 B1 | 4/2004 | Turba | 707/2 |
| 6,874,122 B1 * | 3/2005 | Bates et al. | 715/236 |
| 2006/0168506 A1 * | 7/2006 | Endo et al. | 715/500.1 |

FOREIGN PATENT DOCUMENTS

| EP | 1152330 | 11/2001 |
| EP | 1213664 | 6/2002 |

* cited by examiner

*Primary Examiner*—Doug Hutton
*Assistant Examiner*—Tionna Smith
(74) *Attorney, Agent, or Firm*—Kunzler Needham Massey & Thorpe (57) ABSTRACT

An apparatus, system, and method are disclosed for rendering multiple segment hypertext script. An identification module identifies a plurality of segments in a hypertext script. Each segment is delimited by at least one tag and includes an instruction for rendering a segment display region that is a portion of a display image described by the hypertext script. A calculation module calculates display coordinates for each segment display region. The display coordinates specify the spatial location and dimensions of the segment display region. A format module formats each segment as an independently displayable formatted segment hypertext script configured to be displayed within the corresponding segment display region. A rendition module renders each formatted segment hypertext script within the corresponding segment display region as a Java object using Java functionality.

20 Claims, 7 Drawing Sheets

100

<HTML> ~ 105

<HEAD> ~ 110

120 { <TITLE>Framed Page</TITLE> ~ 115

</HEAD> ~ 117

150a { <FRAMESET ROWS="60,*" FRAMESPACING=0> ~ 130a

<FRAME SRC="frame1.html"> ~ 135a

150b { <FRAMESET COLS=55,* FRAMESPACING=0> ~ 130b

125 { <FRAME SRC="frame2.html"> ~ 135b

150c { <FRAME SRC="frame3.html"> ~ 135c

</FRAMESET> ~ 140a

</FRAMESET> ~ 140b

</HTML> ~ 145

(Prior Art)

APPARATUS, SYSTEM, AND METHOD FOR RENDERING MULTIPLE SEGMENT HYPERTEXT SCRIPT

BACKGROUND OF THE INVENTION

1. Field of the Invention

This invention relates to rendering hypertext script and more particularly relates to rendering multiple segments of hypertext script using Java functionality.

2. Description of the Related Art

Hypertext script such as hypertext markup language ("HTML") script, extensible hypertext markup language ("XHTML"), and the like is used to display text, images, menu options, and audio, herein referred to collectively as data. The hypertext script is typically platform independent. That is the hypertext script may be displayed using a plurality of data processing device hardware and software platform combinations. For example, the same hypertext script may be displayed on a computer employing an x86 instruction set and running a Windows XP operating system produced by Microsoft Corporation of Redmond, Wash., on an x86 computer running a Linux-based operating system, and on a computer employing a PowerPC instruction set and running the OS X operating system produced by Apple Computer Incorporated.

Hypertext script is typically displayed using a browser. The browser is a platform specific software application, executing on a specified combination of hardware and software. For example, a version of the Internet Explorer browser from Microsoft Corporation may execute only on x86 computers running the Windows XP operating system or the like.

Platform independent software applications have also become increasingly popular because like a hypertext script, platform independent software applications may execute on a plurality of hardware and software platforms. Java technology is often used to create platform independent software applications. The Java software application is referred to herein as a Java application. The Java application often may be executed by a plurality of hardware and software platforms.

Some Java applications are configured to display hypertext script as a Java object using Java functionality. For example, a Java application may display HTML script using the JEditorPane Java object. Unfortunately, Java objects such as JEditorPane cannot properly display some hypertext script with multiple segments such as HTML frames. Instead, the Java application must rely on a platform specific browser to display the multiple segment hypertext script. As a result, a Java application that must rely on a browser to display the multiple segment hypertext script is not platform independent.

From the foregoing discussion, it should be apparent that a need exists for an apparatus, system, and method that render multiple segment hypertext script as a Java object using Java functionality. Beneficially, such an apparatus, system, and method would allow a platform independent Java application to render multiple segment hypertext script.

SUMMARY OF THE INVENTION

The present invention has been developed in response to the present state of the art, and in particular, in response to the problems and needs in the art that have not yet been fully solved by currently available multiple segment hypertext script rendering methods. Accordingly, the present invention has been developed to provide an apparatus, system, and method for rendering hypertext script that overcome many or all of the above-discussed shortcomings in the art.

The apparatus to render hypertext script is provided with a plurality of modules configured to functionally execute the steps of identifying a plurality of segments, calculating display coordinates for a display region of each segment, formatting each segment as an independently displayable formatted segment hypertext script, and rendering each formatted segment hypertext script. These modules in the described embodiments include an identification module, a calculation module, a format module, and a rendition module.

The identification module identifies a plurality of segments in a hypertext script. The hypertext script may be an HTML script, an XHTML script, or the like. Each segment is delimited by at least one tag such as an HTML frameset tag. In addition, each segment includes an instruction for rendering a segment display region that is a portion of a display image described by the hypertext script.

The calculation module calculates display coordinates for each segment display region. The display coordinates specify the spatial location and dimensions of the segment display region. For example, the display coordinates may specify an area of pixels within the display image.

The format module formats each segment as an independently displayable formatted segment hypertext script that is configured to be displayed within the corresponding segment display region. For example, the format module may format HTML script for an HTML table cell as an independently displayable HTML script.

The rendition module renders each formatted segment hypertext script within the corresponding segment display region. For example, the rendition module may render a formatted segment hypertext script for a first segment with an area of pixels specified by display coordinates for the first segment. The rendition module renders the formatted segment hypertext script as a Java object using Java functionality. The apparatus allows a platform independent Java application to render multiple segment hypertext script.

A system of the present invention is also presented to render multiple segment hypertext script. The system may be embodied in a Java application executing on a computer system. In particular, the system, in one embodiment, includes a memory module, a processor module, and the Java application.

The memory module stores and retrieves software instructions and data as is well known to those skilled in the art. The processor module executes the software instructions and processes the data. A plurality of software instructions organized as one or more software processes may embody the Java application. The Java application may be platform independent.

The Java application includes an identification module, a calculation module, a format module, and a rendition module. The identification module configured to identify a plurality of segments in a hypertext script. Each segment includes an instruction for rendering a segment display region. The calculation module calculates display coordinates for each segment display region. In one embodiment, the calculation module calculates the display coordinates by identifying spatial dimensions from a parameter. The parameter may be selected from a specified number of pixels and a specified percentage of a display image spatial dimension.

The format module formats each segment as an independently displayable formatted segment hypertext script that is displayed within the corresponding segment display region. The rendition module renders each formatted segment hypertext script within the corresponding segment display region as a Java object using a Java JEditorPane object. The system renders multiple segment hypertext script using a platform independent Java application.

A method of the present invention is also presented for rendering hypertext script. The method in the disclosed embodiments substantially includes the steps to carry out the functions presented above with respect to the operation of the described apparatus and system. In one embodiment, the method includes identifying a plurality of segments, calculating display coordinates for each segment display region, formatting each segment as an independently displayable formatted segment hypertext script, and rendering each formatted segment hypertext script.

An identification module identifies a plurality of segments in a hypertext script. Each segment is delimited by at least one tag and includes an instruction for rendering a segment display region that is a portion of a display image described by the hypertext script. A calculation module calculates display coordinates for each segment display region. The display coordinates specify the spatial location and dimensions of the segment display region. A format module formats each segment as an independently displayable formatted segment hypertext script configured to be displayed within the corresponding segment display region. A rendition module renders each formatted segment hypertext script within the corresponding segment display region as a Java object using Java functionality.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention renders multiple segment hypertext script by identifying each segment in the script and rendering each segment as independently displayable formatted segment hypertext script within a segment display region using Java functionality. In addition, the embodiment of the present invention may allow a platform independent Java application to render the multiple segment hypertext script. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
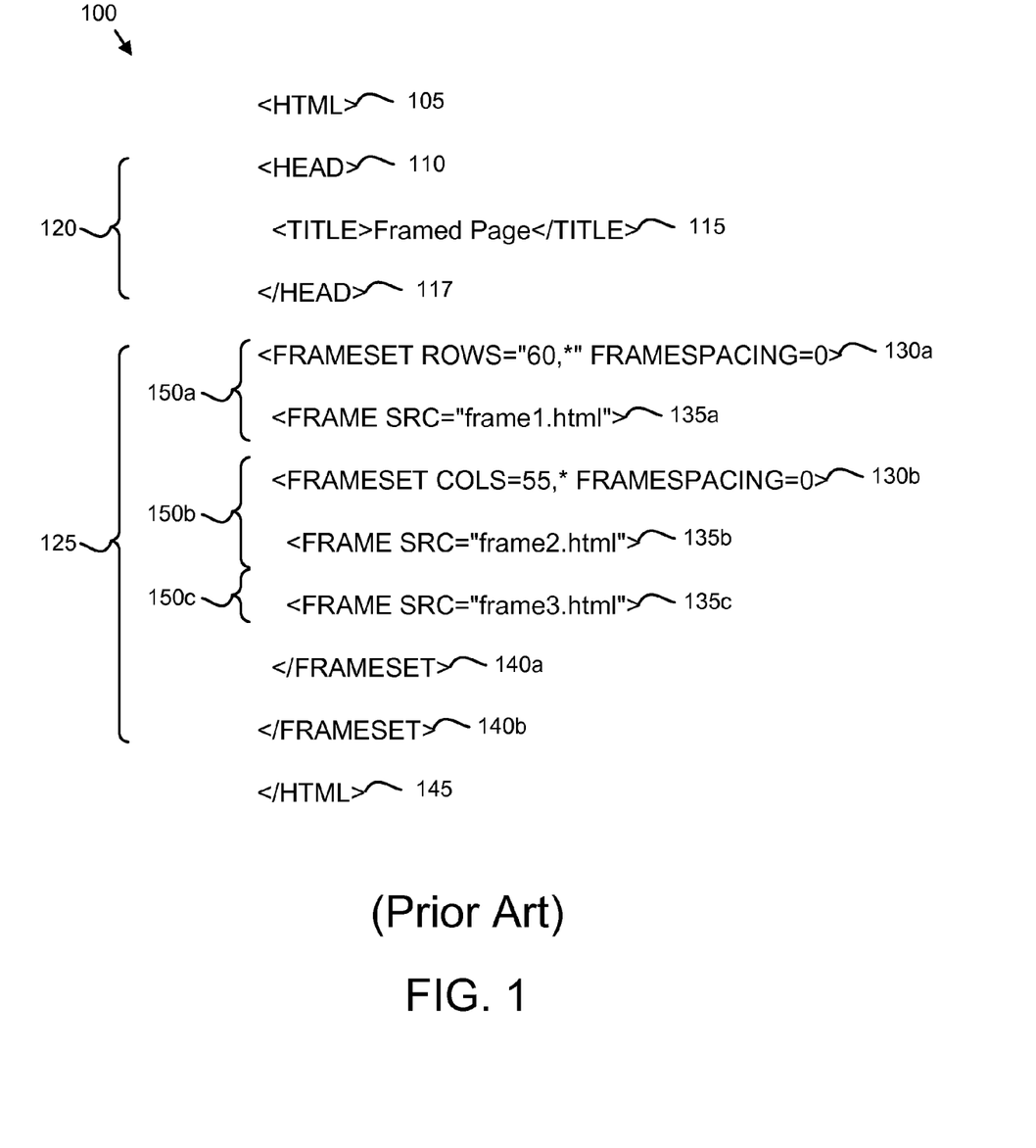
FIG. 1 is a text diagram illustrating one embodiment of an HTML script in accordance with the present invention.

FIG. 1 is a text diagram illustrating one embodiment of an HTML script 100 in accordance with the present invention. The script 100 is illustrative of a hypertext script. The script 100 includes an HTML script tag 105, an end of HTML script tag 145, a header 120, and a body 125. The HTML script tag 105 indicates to a device configured to parse and display the script 100 that the following script is configured as HTML script. The end of HTML script tag 145 indicates the end of the HTML script 100.

The header 120 contains information about the HTML script 100. A head tag 110 marks the beginning of the header 120 and an end of header tag 117 marks the end of the header 120 as is well known to those skilled in the art. As depicted, the header 120 contains a title tag 115. Alternatively, the header 120 may include a metatag for a script 100 description, a metatag for script key words, a link tag, a base tag, and the like.

The body 125 is depicted with one or more frameset tags 130, one or more frame tags 135, and one or more end of frameset tags 140 as is well known to those skilled in the art. Each frameset tag 130 defines one or more spatial dimensions for a frame as will be described hereafter. Each end of frameset tag 140 indicates the end of the application of a frameset tag spatial dimensions. The frame tags 135 indicate an HTML file that defines the content of each frame.

A first frameset tag 130a specifies that a first frameset spatial dimension comprises a row sixty (60) pixels high and that is as wide as a display image. In addition, the first frameset tag 130a specifies a spacing of zero (0) pixels between frames. A first frame tag 135a specifies contents of a first frame. A second frameset tag 130b specifies a second frameset spatial dimension comprising a column fifty-five (55) pixels wide and as high as an available display image subject to the constraints of the first frameset tag 130a. In addition, the second frameset tag 130b also specifies a spacing of zero (0) pixels between frames. A second frame tag 135b specifies contents of a second frame while a third frame tag 135c specifies contents of a third frame.

In the depicted HTML script 100, the first frameset tag 130a and the first frame tag 135a comprise a first segment 150a, the second frameset tag 130b and the second frame tag 135b comprise a second segment 150b, and the third frame tag 135c comprises a third segment 150c. In one embodiment, the first frameset tag 130a also defines the second segment 150b while the first and second frameset tags 130a, 130b also define the third segment 150c. Points 220, 225, 240, 245, 250, and 255 and coordinate systems 230 and 235 will be described hereafter in connection with FIG. 5.

Figure 2:
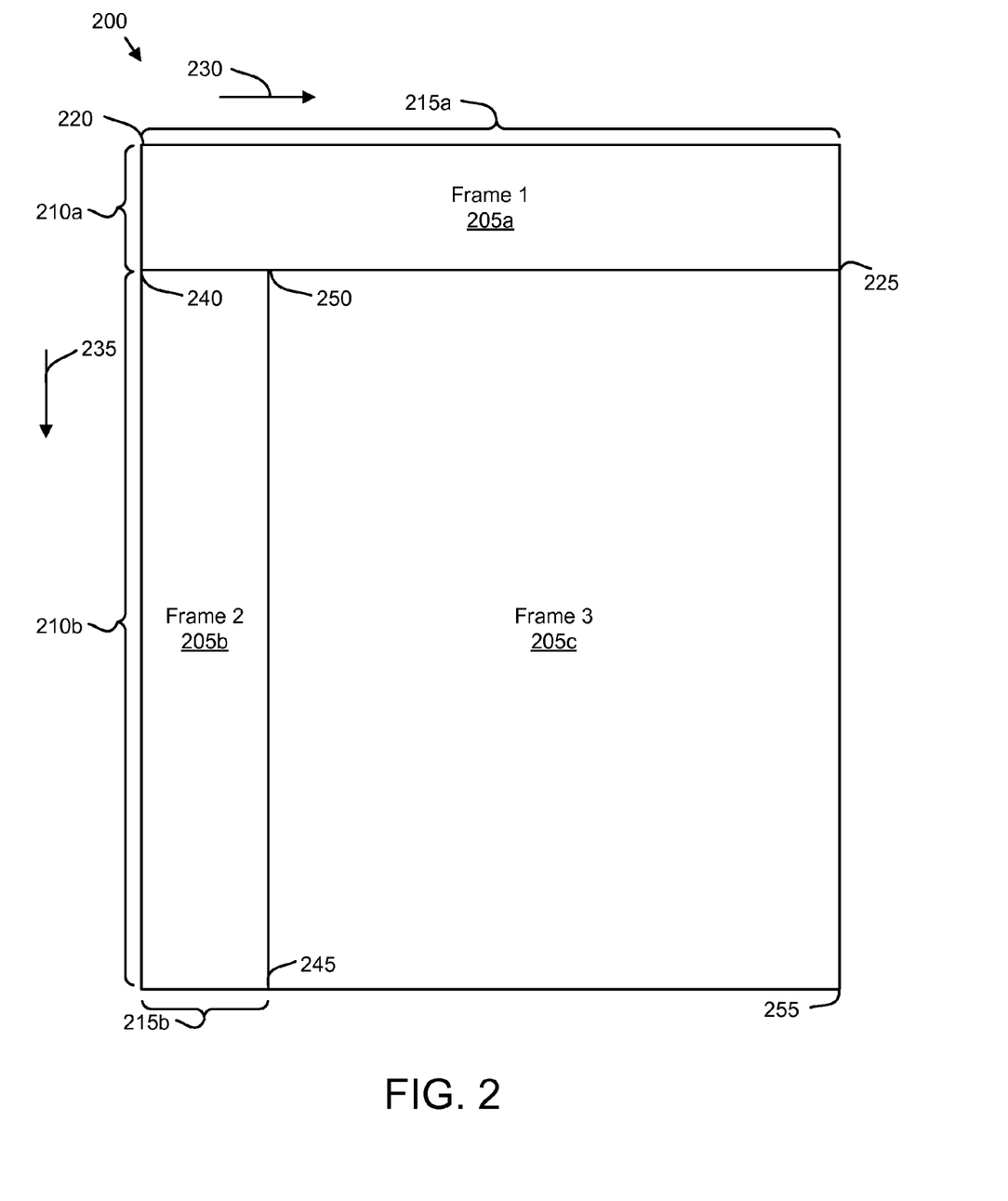
FIG. 2 is a schematic block diagram of one embodiment of a display image in accordance with the present invention.

FIG. 2 is a schematic block diagram of one embodiment of a display image 200 in accordance with the present invention. The display image 200 represents the rendered frames 205 defined by the HTML script 100 of FIG. 1. For example, the display image 200 may be rendered within a graphical user interface window on a display. The description of the display image 200 refers to elements of FIG. 1, like numbers referring to like elements.

A first frame, Frame 1 205a, is rendered to spatial dimensions specified by the first frameset tag 130a of the first segment 150a. Thus Frame 1 205a is rendered as a row with a first row height 210a of sixty (60) pixels and a first column width 215a that spans the display image 200. The contents of Frame 1 205a are described by an HTML script file "frame1.html" as specified by the first frame tag 135a of the first segment 150a.

A second frame, Frame 2 205b, is rendered to spatial dimensions specified by the second frameset tag 130b of the second segment 150b. The second frameset tag 130b is nested below the first frameset tag 130a and so is subject to the constraints of the first frameset tag 130a. Thus Frame 2 205b is rendered with a second column width 215b of fifty-five (55) pixels and a second row height 210b that extends from Frame 1 205a to a boundary of the display image 200. The contents of Frame 2205b are described by an HTML script file "frame2.html" as specified by the second frame tag 135b of the second segment 150b.

A third frame, Frame 3 205c, is rendered to spatial dimensions subject to the constraints of the first and second frameset tags 130a, 130b. Thus Frame 3 205c is rendered in the display image 200 less the first sixty (60) pixels of the first row height 210a and the fifty-five (55) pixels of the second column width 215b. The contents of Frame 3 205b are described by an HTML script file "frame3.html" as specified by the third frame tag 135c of the third segment 150c.

For simplicity the contents of Frame 1 205a, Frame 2 205b, and Frame 3 205c are not depicted. Instead, the disposition of the frames 205 is shown. Each frame 205 is representative of a hypertext script segment 150. The segments 150 divide the display image 200 into one or more segment display regions as exemplified by the frames 205.

A typical browser is capable of rendering multiple segments 150 of the HTML script 100 of FIG. 1 as the frames 205 of FIG. 2. Unfortunately, a Java application cannot render the multiple segments 150 of the HTML script 100 as a Java object using Java functionality. For example, the JEditorPane object that is typically used to render HTML script 100 within a Java application is not configured to render the frames 205 from HTML script 100. The embodiment of the present invention renders the multiple segments 150 of hypertext script as Java objects using Java functionality as will be described hereafter.

Figure 3:
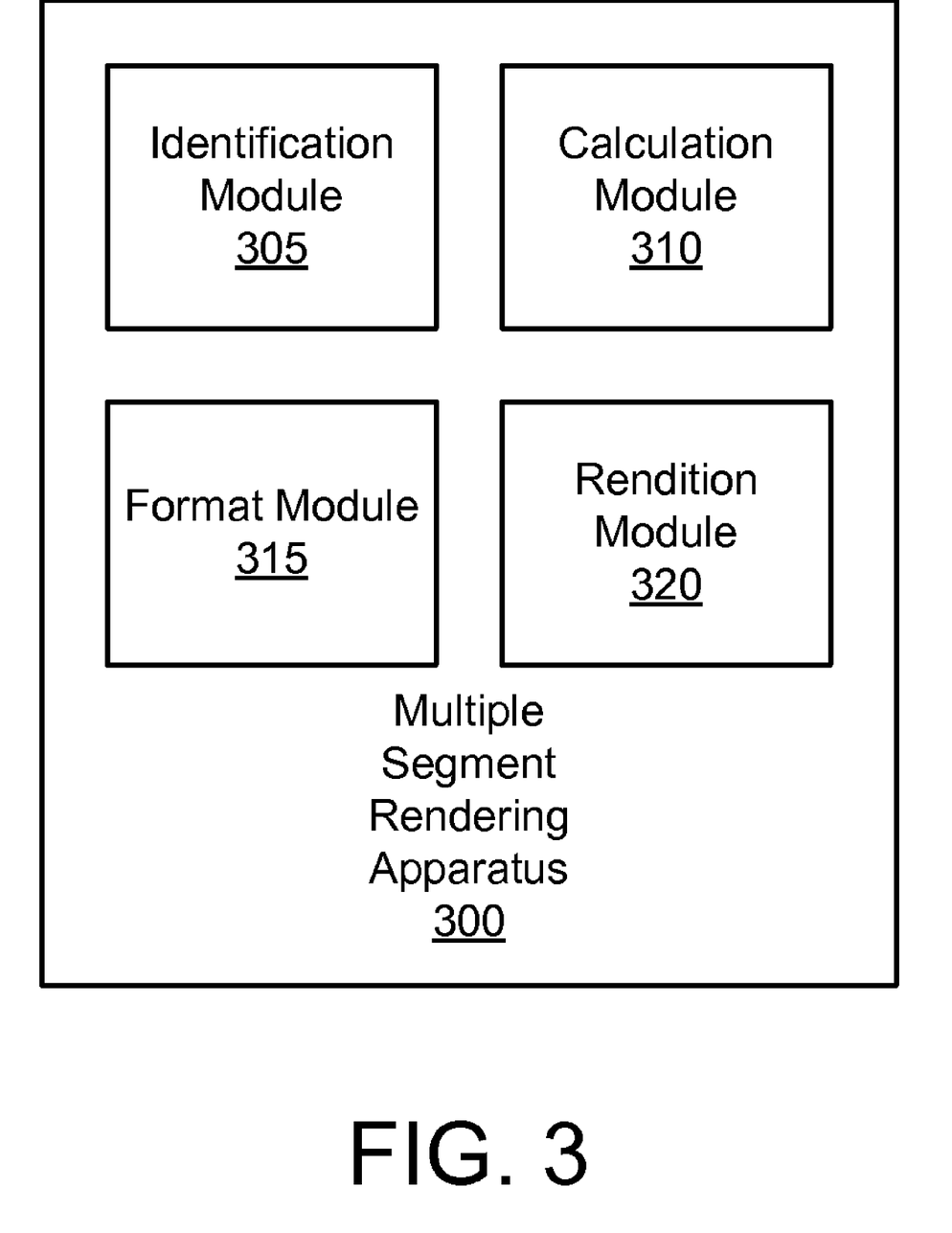
FIG. 3 is a schematic block diagram of one embodiment of a multiple segment rendering apparatus of the present invention.

FIG. 3 is a schematic block diagram of one embodiment of a multiple segment rendering apparatus 300 of the present invention. The apparatus 300 includes an identification module 305, calculation module 310, format module 315, and rendition module 320. The description of the apparatus 300 refers to elements of FIGS. 1 and 2, like numbers referring to like elements.

The identification module 305 identifies a plurality of segments 150 in a hypertext script. The hypertext script may be an HTML script 100, an XHTML script, or the like. Each segment 150 is delimited by at least one tag such as the HTML frameset tag 130 and frame tag 135, an HTML table tag, an HTML row tag, an HTML column tag, and the like. Alternatively, each segment 150 may be delimited by one or more tags, and by the cumulative effect of one or more tags. In addition, each segment 150 includes an instruction for rendering a segment display region that is a portion of a display image 200 described by the hypertext script such as an HTML frame tag 135.

The calculation module 310 calculates display coordinates for each segment display region. For example, the frames 205 define segment display regions within the display image 200 of FIG. 2. The display coordinates specify the spatial location and dimensions of the corresponding segment display region.

The format module 315 formats each segment 150 as an independently displayable formatted segment hypertext script that is configured to be displayed within the segment's display region. For example, the format module 315 may format the first frame tag 135a as the file "frame1.html." Alternatively, the format module 315 may format the HTML script for an HTML table cell as an independently displayable HTML script as will be described hereafter.

The rendition module 320 renders each formatted segment hypertext script within the corresponding segment display region. For example, the rendition module 320 may render the formatted segment hypertext script "frame1.html" for the first segment 150a within an area of pixels specified by Frame 1 205a. The rendition module 320 renders the formatted segment hypertext script as a Java object using Java functionality.

Figure 4:
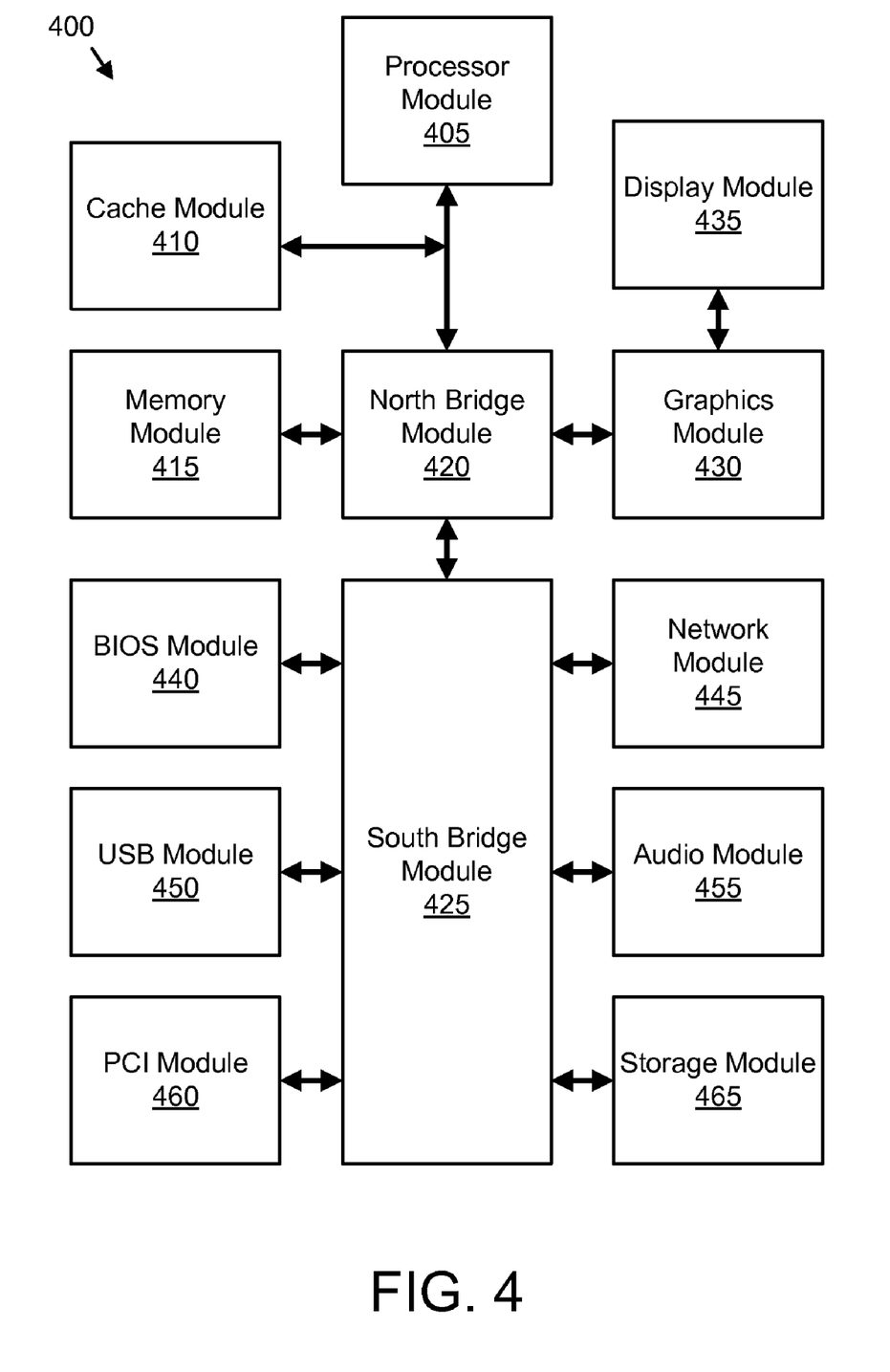
FIG. 4 is a schematic block diagram of one embodiment of a computer of the present invention.

FIG. 4 is a schematic block diagram of one embodiment of a computer 400 of the present invention. The computer 400 includes a processor module 405, a cache module 410, a memory module 415, a north bridge module 420, a south bridge module 425, a graphics module 430, a display module 435, a basic input/output system ("BIOS") module 440, a network module 445, a universal serial bus ("USB") module 450, an audio module 455, a peripheral component interconnect ("PCI") module 460, and a storage module 465.

The processor module 405, cache module 410, memory module 415, north bridge module 420, south bridge module 425, graphics module 430, display module 435, BIOS module 440, network module 445, USB module 450, audio module 455, PCI module 460, and storage module 465, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate to substrate wiring, or circuit card traces or wires connecting the semiconductor devices.

The memory module 415 stores and retrieves software instructions and data. The processor module 405 executes the software instructions and manipulates the data as is well know to those skilled in the art. In one embodiment, the software instructions embody one or more software processes. The software processes may comprise the identification module 305, calculation module 310, format module 315, and rendition module 320. In one embodiment, a Java application comprises the software processes and includes the identification module 305, calculation module 310, format module 315, and rendition module 320.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
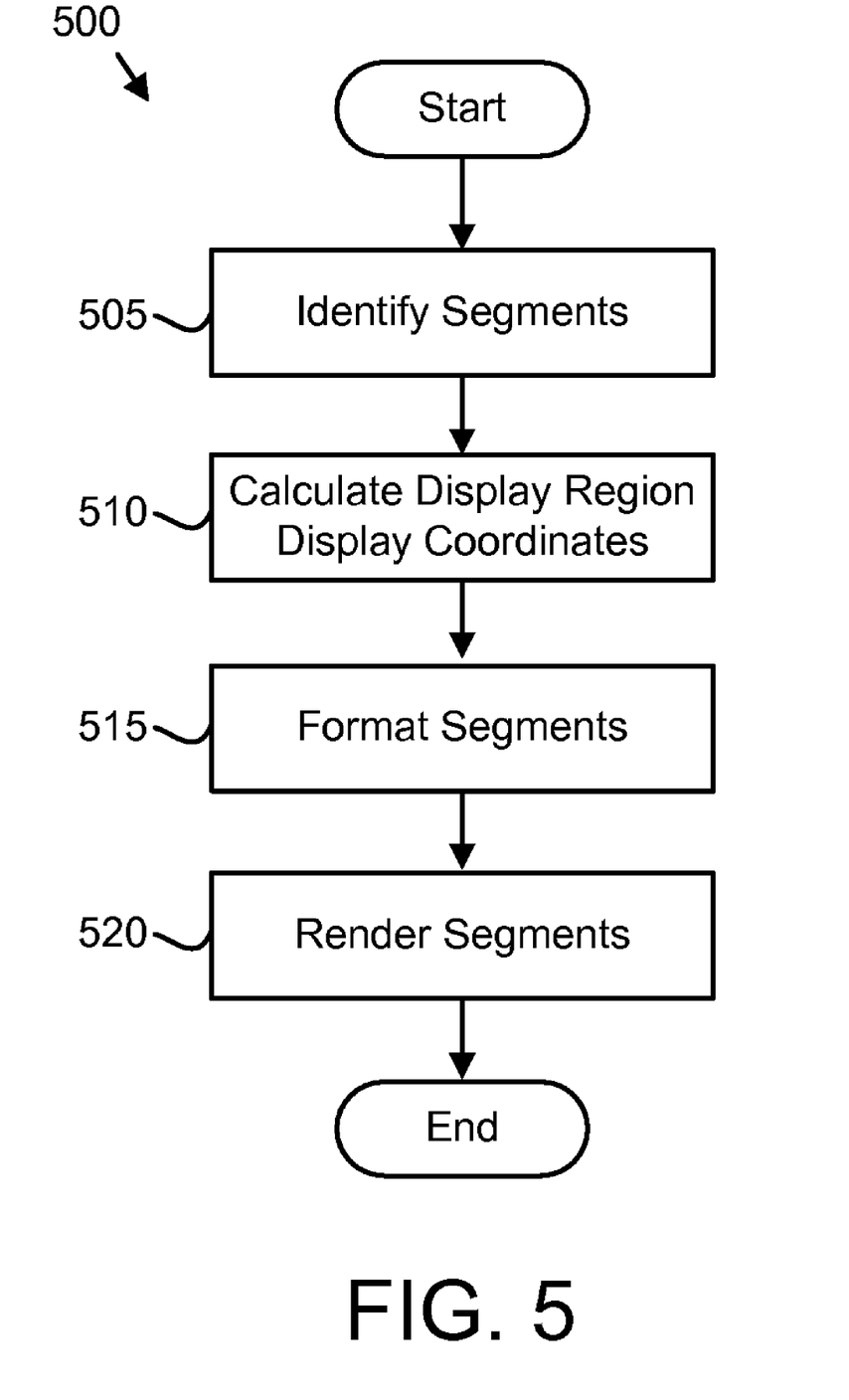
FIG. 5 is a schematic flow chart diagram illustrating one embodiment of a multiple segment rendering method in accordance with the present invention.

FIG. 5 is a schematic flow chart diagram illustrating one embodiment of a multiple segment rendering method 500 in accordance with the present invention. The method 500 substantially includes the steps to carry out the functions presented above with respect to the operation of the described apparatus 300 and computer 400 of FIGS. 3 and 400, processing the HTML script 100 of FIG. 1 and rendering the display image 200 of FIG. 2. The description of the method 500 refers to elements of FIGS. 1-4, like numbers referring to like elements.

The method 500 begins and the identification module 305 identifies 505 a plurality of segments 150 in a hypertext script. The identification module 305 may be executing on the processor module 405. In addition, the identification module 305 may receive the hypertext script through the network module 445, south bridge module 425, and north bridge module 420 respectively.

The identification module 305 may identify 505 each segment 150 from on or more tags delimiting the segments 150. In one embodiment, a tag may delimit one or more segments 150. For example, the identification module 305 may identify 505 a segment from a frameset tag 130. Each segment includes at least one an instruction for rendering a segment display region that is a portion of a display image 200 described by the hypertext script.

The identification module 305 may parse the hypertext script to identify the segments 150 as is well known to those skilled in the art. For example, the identification module 305 may parse the frameset tags 130 and frame tags 130 to identify segments 150. Alternatively, the identification module 305 may parse HTML table, row, and column tags.

The calculation module 310 calculates 510 display coordinates for each segment display region. The display coordinates specify the spatial location and dimensions of the corresponding segment display region.

For example, the first segment 150a of FIGS. 1 and 2 may be specified by the display coordinates $(x_{0a}, y_{0a})$ and $(x_{0b}, y_{0b})$ where $(x_{0a}, y_{0a})$ refers to point 220 of FIG. 2 and $(X_{0b}, y_{0b})$ refers to point 225 of FIG. 2. The variables x and y refer to values in an x coordinate system 230 and a y coordinate system 235 respectively, with the arrows indicating increasing values. The variables $x_{0a}$ and $y_{0a}$ may be given initial values such as zero (0) as illustrated by Equations 1 and 2.

$$x_{0a}=0 \qquad \text{Equation 1}$$

$$y_{0a}=0 \qquad \text{Equation 2}$$

The variable $x_{0a}$ is assigned the value $d_{x0}$ where $d_{x0}$ is the width of the display image 200 as shown in Equation 3.

$$x_{0b}=d_{x0} \qquad \text{Equation 3}$$

The variable $y_{0a}$ is assigned the value $d_{y0}$ where $d_{y0}$ is the row height of the first frameset tag 130a or sixty (60) pixels as shown in Equation 4.

$$y_{0b}=d_{y0} \qquad \text{Equation 4}$$

The display coordinates for the second and third segments 150b, 150c of FIGS. 1 and 2 may be calculated using Equations 5-8 for n=1 and n=2 respectively where $(x_{1a}, y_{1a})$ and $(x_{1b}, y_{1b})$ are the display coordinates for the second segment 150b with $(x_{1a}, y_{1a})$ referring to point 240 and $(x_{1b}, y_{1b})$ referring to point 245. In addition, $(x_{2a}, y_{2a})$ and $(x_{2b}, y_{1b})$ are the display coordinates for the third segment 150c where $(x_{2a}, y_{2a})$ refers to point 250 and $(x_{2b}, y_{1b})$ refers to point 255. The value $d_{x1}$ is the column width of the second frameset tag 130b.

$$x_{na} = x_{(n-1)b} \quad \text{Equation 5}$$

$$y_{na} = y_{(n-1)b} \quad \text{Equation 6}$$

$$x_{nb} = d_{xn} \quad \text{Equation 7}$$

$$y_{nb} = d_{yn} \quad \text{Equation 8}$$

The value $d_{y1}$ is the calculated using Equation 9, where $k_y$ is the height of the display image 200 and n=1.

$$d_{yn} = k_y - y_{(n-1)b} \quad \text{Equation 9}$$

The values $d_{x2}$ and $d_{y2}$ are calculated using Equations 9 and 10, where $k_x$ is the width of the display image 200 and n=2.

$$d_{xn} = k_x - x_{(n-1)b} \quad \text{Equation 10}$$

The format module 315 formats 515 each segment 150 as an independently displayable formatted segment hypertext script configured to be displayed within the segment's display region. An example of formatting 515 segments will be described hereafter in connection with FIGS. 6-8.

The rendition module 320 renders 520 each formatted segment hypertext script within the segment display region as a Java object using Java functionality and the method 500 terminates. In one embodiment the rendition module 320 specifies the segment display region using the display coordinates for the segment 150. The rendition module 320 may further render 520 the formatted segment hypertext script configured as HTML script 100 as a Java object using the Java JEditorPane object. The JEditorPane object cannot not render HTML script with multiple segments such as frames 205. Therefore, the JEditorPane object cannot correctly render the original HTML script 100.

For example, the rendition module 320 may render the first, second, and third segments 150a, 150b, 150c of FIG. 1 within first, second, and third segment display regions as exemplified by Frame 1 205a, Frame 2 205b, and Frame 3 205c. Thus the rendition module 320 displays the file "frame1.html" within Frame 1 205a, the file "frame2.html" within Frame 2 205b, and the file "frame3.html" with Frame 3 205c. The method 500 displays hypertext script with multiple segments as a Java object using Java functionality, allowing a platform independent Java application to render multiple segment hypertext script.

Figure 6:
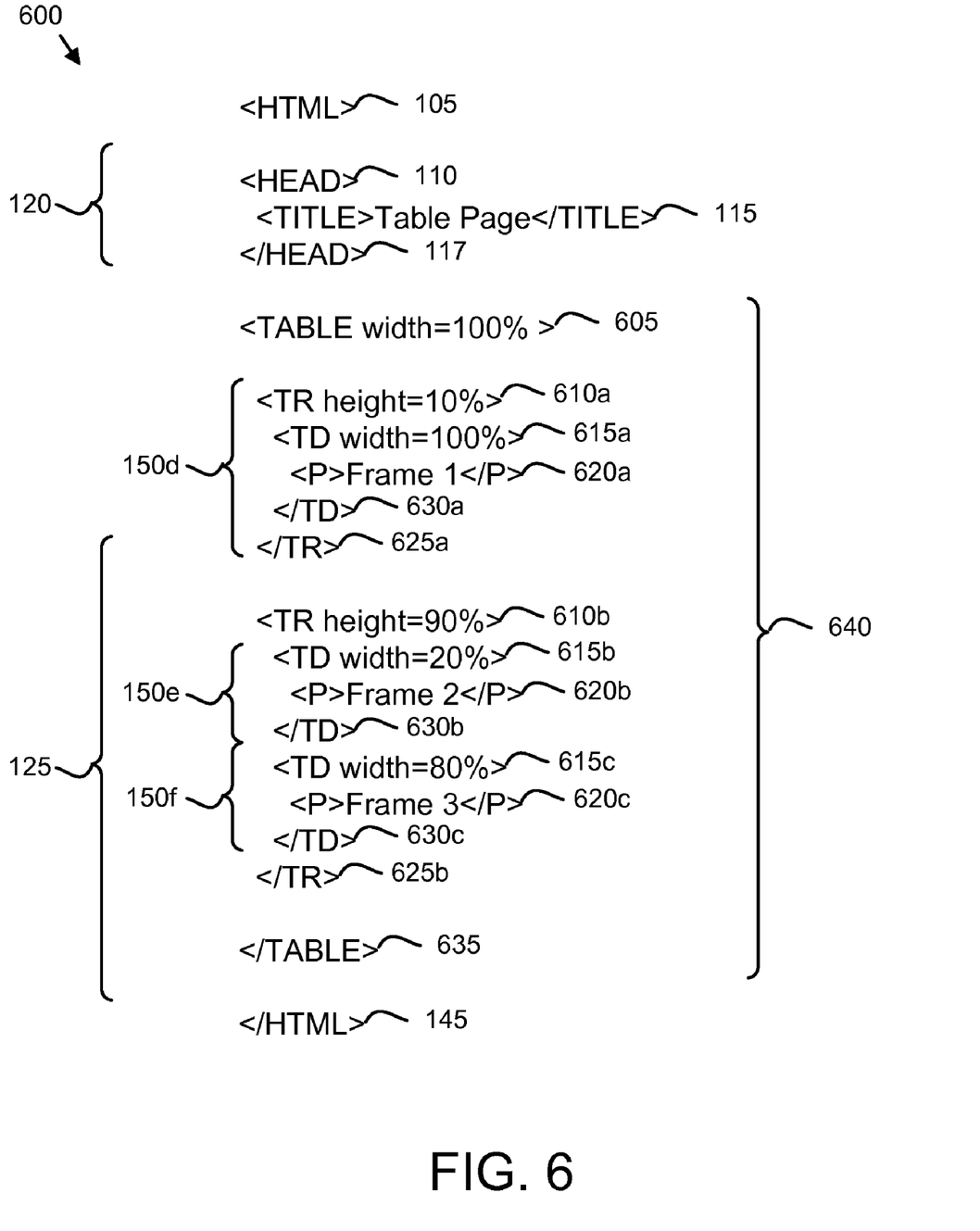
FIG. 6 is a text diagram illustrating one alternate embodiment of an HTML script in accordance with the present invention.

FIG. 6 is a text diagram illustrating one alternate embodiment of an HTML script 600 in accordance with the present invention. The script 600 describes a display image 200 of a prophetic example with three segments 150. The description of the script 600 refers to elements of FIGS. 1-5, like numbers referring to like elements. The script 600 includes an HTML script tag 105, an end of HTML script tag 145, a header 120, a body 125, a head tag 110, an end of header tag 117, and a title tag 115 as described in FIG. 1.

The script 600 further includes a table tag 605 and an end of table tag 635 that delimit an HTML table 640. The table 640 includes one or more row tags 610 and one or more column tags 615. The row tags 610 and the column tags 615 specify a fourth, fifth, and sixth segment 150e, 150f, 150g as is well known to those skilled in the art. Each segment 150e, 150f, 150g includes a paragraph statement 620.

The identification module 305 identifies 505 the fourth, fifth, and sixth segment 150e, 150f, 150g. The calculation module 310 calculates 510 display coordinates for each segment display region. In the depicted script 600, the dimensions of each segment 150 are specified as percentages of the dimensions of the display image 200. The display coordinates may be calculated using Equations 1-10 with the percentage dimensions $p_x$ and $p_y$ converted to pixel dimensions using Equations 11 and 12, where $p_x$ and $p_y$ are percentages of the display image horizontal and vertical dimensions respectively and $k_x$ and $k_y$ are the display image horizontal and vertical dimensions in pixels.

$$d_{yn} = \frac{k_y}{100} p_y \quad \text{Equation 11}$$

$$d_{xn} = \frac{k_x}{100} p_x \quad \text{Equation 12}$$

Figure 7:
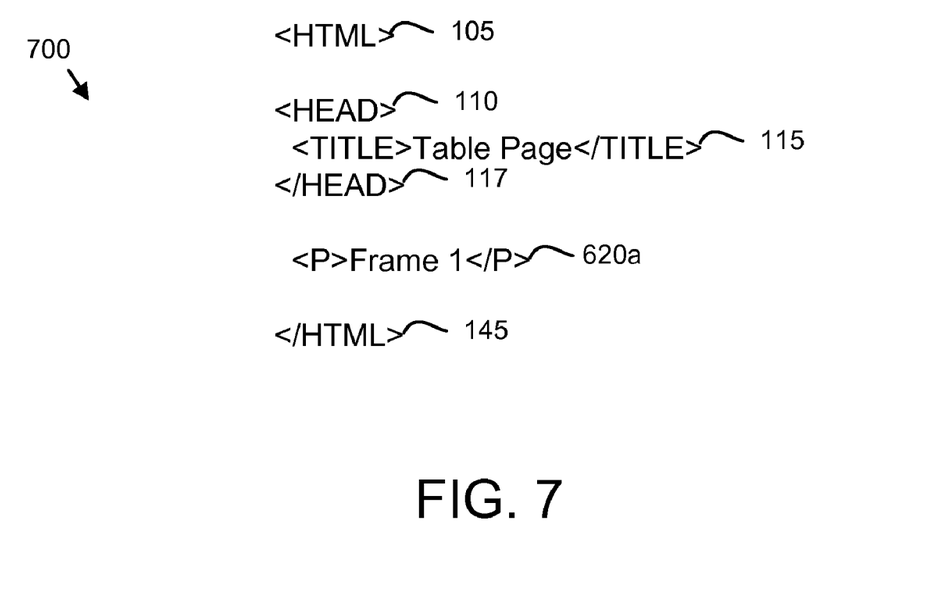
FIG. 7 is a text diagram illustrating one embodiment of an independently displayable formatted segment hypertext script of the present invention.

FIG. 7 is a text diagram illustrating one embodiment of an independently displayable formatted segment hypertext script 700 of the present invention. The script 700 is a prophetic example of the application of step 515 of FIG. 5 to the fourth segment 150d of FIG. 6. In addition, the description of the script 700 refers to elements of FIGS. 1-6, like numbers referring to like elements.

The format module 315 may format 515 the fourth segment 150d as the formatted segment hypertext script 700. The script 700 is independently displayable. In the prophetic example, the format module 315 appends an HTML script tag 105, an end of HTML script tag 145, a head tag 110, an end of header tag 117, and a title tag 115 to a first paragraph statement 620a of FIG. 6. The appended tags 105, 110, 115, 117, 145 allow the first paragraph statement 620a of the fourth segment 150d to be displayed independently of the fifth and sixth segments 150e, 150f. In one embodiment, the format module 315 may append tags copied from the original HTML script 600. The script 700 may be rendered 520 by the rendition module 320 as a Java object using the Java JEditorPane object. In one embodiment, the title tag 115 provides the display image title for the fourth, fifth, and sixth segments 150d, 150e, 150f.

Figure 8:
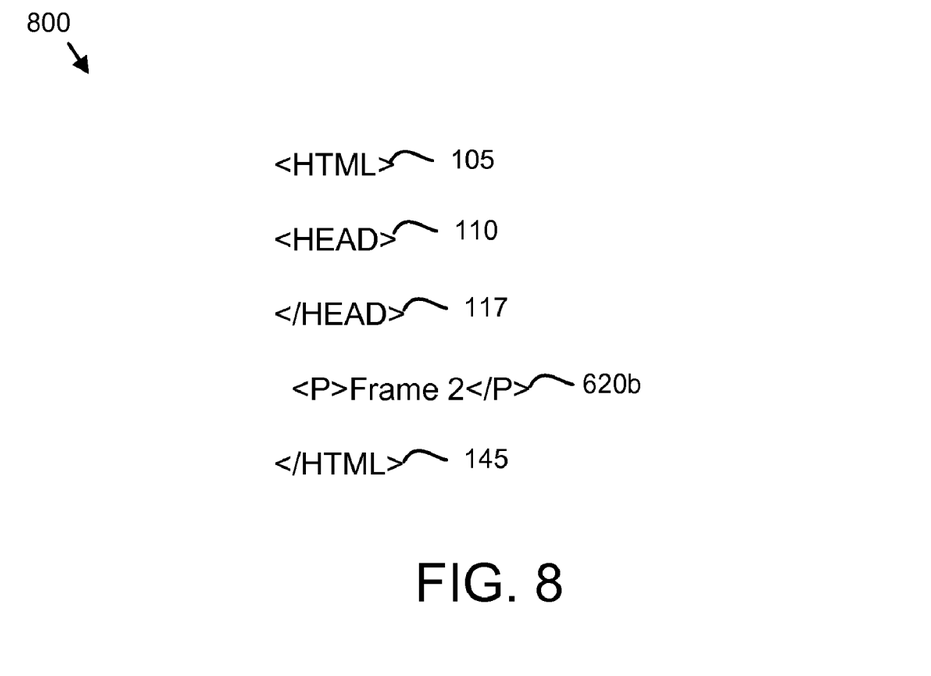
FIG. 8 is a text diagram illustrating one alternate embodiment of an independently displayable formatted segment hypertext script of the present invention.

FIG. 8 is a text diagram illustrating one alternate embodiment of an independently displayable formatted segment hypertext script 800 of the present invention. The script 800 is a prophetic example of the application of step 515 of FIG. 5 to the fifth segment 150e of FIG. 6. In addition, the description of the script 800 refers to elements of FIGS. 1-7, like numbers referring to like elements.

The format module 315 may format 515 the fifth segment 150e as the formatted segment hypertext script 800. The script 800 is independently displayable. In the prophetic example, the format module 315 appends an HTML script tag 105, an end of HTML script tag 145, a head tag 110, and an end of header tag 117 to a second paragraph statement 620b of FIG. 6. The appended tags 105, 110, 117, 145 allow the second paragraph statement 620b of the fifth segment 150e to be displayed independently of the fourth and sixth segments 150d, 150f. The rendition module 320 may render 520 the script 800 as a Java object using the Java JEditorPane object.

The embodiment of the present invention renders hypertext script with multiple segments 150 such as an HTML script 100 by identifying 505 each segment 150 of the script, calculating 510 display coordinates for each segment 150, formatting 515 each segment 150 as independently displayable formatted segment hypertext script, and rendering 520 the formatted segment hypertext script as a Java object within a corresponding segment display region using Java functionality. In addition, the embodiment of the present invention may allow a platform independent Java application to render the multiple segment hypertext script.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to render multiple segment hypertext script, the apparatus comprising:
  an identification module configured to identify a plurality of segments in a hypertext script, the hypertext script comprising instructions for rendering a display image, wherein each segment is delimited by at least one tag and each segment includes an instruction for rendering one of a plurality of segment display regions of the display image instructed by the hypertext script;
  a calculation module configured to calculate display coordinates for each of the plurality of segment display regions, wherein each of the display coordinates specifies the spatial location and dimensions of a respective one of the plurality of segment display regions of the display image;
  a format module configured to format each segment as an independently displayable formatted segment hypertext script configured to be displayed within the corresponding segment display region; and
  a rendition module configured to render each formatted segment of hypertext script within the corresponding segment display region as a Java object using Java functionality;
  wherein the identification, calculation, format, and rendition modules each comprises at least one of logic hardware and executable code, the executable code being stored on one or more computer readable media.

2. The apparatus of claim 1, wherein the identification module, calculation module, format module, and rendition module are embodied in a Java application.

3. The apparatus of claim 1, wherein the hypertext script is configured as a hypertext markup language ("HTML") script.

4. The apparatus of claim 1, wherein the at least one tag is configured as an HTML frameset tag.

5. The apparatus of claim 4, wherein the at least one tag is selected from an HTML table tag, an HTML column tag, and an HTML row tag.

6. The apparatus of claim 1, wherein the Java functionality comprises a Java JEditorPane object.

7. The apparatus of claim 1, wherein the calculation module calculates the display coordinates by identifying spatial dimensions from a specified number of pixels.

8. The apparatus of claim 1, wherein the calculation module calculates the display coordinates by identifying spatial dimensions from a specified percentage of a display image spatial dimension.

9. A computer readable medium tangibly embodying a program of machine-readable instructions executable by a digital processing apparatus to perform an operation to render hypertext script, the operation comprising:
  identifying a plurality of segments in a hypertext script wherein each segment is delimited by at least one tag and includes an instruction for rendering one of a plurality of frames of a display image described by the hypertext script;
  calculating display coordinates for each frame wherein the display coordinates specify the spatial location and dimensions of the frame;
  formatting each segment as an independently displayable formatted segment hypertext script configured to be displayed within the corresponding frame; and
  rendering each formatted segment hypertext script within the corresponding frame as a Java object using Java functionality.

10. The computer readable medium of claim 9, wherein the instructions are embodied in a Java application.

11. The computer readable medium of claim 10, wherein the Java functionality comprises a Java JEditorPane object.

12. The computer readable medium of claim 11, wherein the hypertext script is configured as an HTML script.

13. The computer readable medium of claim 12, wherein the at least one tag is selected from an HTML frameset tag, an HTML table tag, an HTML column tag, and an HTML row tag.

14. The computer readable medium of claim 13, wherein calculating the display coordinates comprises an operation to identify spatial dimensions from a specified number of pixels.

15. The computer readable medium of claim 13, wherein calculating the display coordinates comprises an operation to identify spatial dimensions from a specified percentage of a display image dimension.

16. A system to render multiple segment hypertext script, the system comprising:
  a memory module configured to store and retrieve software instructions and data;
  a processor module configured to execute the software instructions and process the data;
  a Java application stored in the memory module and executed by the processor module and comprising
    an identification module configured to identify a plurality of segments in a multiple segment hypertext script wherein each segment is delimited by at least one tag and includes an instruction for rendering a segment display region that is a portion of a display image described by the multiple segment hypertext script, and wherein the multiple segment hypertext script is in a non-displayable state as a Java object using Java functionality;
    a calculation module configured to calculate display coordinates for each segment display region wherein the display coordinates specify the spatial location and dimensions of the segment display region;
    a format module configured to format each segment as an independently displayable formatted segment hypertext script configured to be displayed within the corresponding segment display region, the formatted multiple segment hypertext script being in a displayable state as a Java object using Java functionality; and
    a rendition module configured to render each formatted segment hypertext script within the corresponding segment display region as a Java object using Java functionality.

17. The system of claim 16, wherein the Java application is platform independent.

18. The system of claim 17, wherein the at least one tag is selected from an HTML frameset tag, an HTML table tag, an HTML column tag, and an HTML row tag.

19. The system of claim 18, wherein the calculation module calculates the display coordinates by identifying spatial dimensions from a parameter selected from a specified number of pixels and a specified percentage of a display image spatial dimension.

20. A method for deploying computer infrastructure, comprising integrating computer-readable code into a computing system, wherein the code in combination with the computing system is capable of performing the following:

identifying a plurality of segments in an multiple segment HTML script, the multiple segment HTML script comprising instructions for rendering a display image, wherein each segment is delimited by at least one tag selected from an HTML frameset tag, an HTML table tag, an HTML column tag, and an HTML row tag, and each segment includes an instruction for rendering one of a plurality of segment display regions of the display image instructed by the multiple segment HTML script;

calculating display coordinates for each of the plurality of segment display regions wherein each of the display coordinates specifies the spatial location and dimensions of a respective one of the plurality of segment display regions of the display image;

formatting each segment as an independently displayable formatted segment HTML script configured to be displayed within the corresponding segment display region; and rendering each formatted segment HTML script within the corresponding segment display region as a Java object using Java functionality.

* * * * *